(12) United States Patent
Wassvik et al.

(10) Patent No.: US 9,857,917 B2
(45) Date of Patent: Jan. 2, 2018

(54) OPTICAL COUPLING OF LIGHT INTO TOUCH-SENSING SYSTEMS

(71) Applicant: FLATFROG LABORATORIES AB, Lund (SE)

(72) Inventors: Ola Wassvik, Briisarp (SE); Hakan Bergstrom, Toma Hallestad (SE); Thomas Craven-Bartle, Siidra Sandby (SE); Christer Fahraeus, Bjarred (SE)

(73) Assignee: FLATFROG LABORATORIES AB, Lund (SE)

( * ) Notice: Subject to any disclaimer, the term of this patent is extended or adjusted under 35 U.S.C. 154(b) by 12 days.

(21) Appl. No.: 14/551,248

(22) Filed: Nov. 24, 2014

(65) Prior Publication Data

US 2016/0026337 A1    Jan. 28, 2016

Related U.S. Application Data

(63) Continuation-in-part of application No. PCT/SE2013/051532, filed on Dec. 17, 2013.
(Continued)

(30) Foreign Application Priority Data

Dec. 17, 2012 (SE) ...................... 1251437

(51) Int. Cl.
*G06F 3/042* (2006.01)
*F21V 8/00* (2006.01)

(52) U.S. Cl.
CPC ......... *G06F 3/0421* (2013.01); *G02B 6/0031* (2013.01); *G06F 3/042* (2013.01);
(Continued)

(58) Field of Classification Search
CPC ..................... G06F 3/0421; G06F 1/16; G06F 2203/04109; G02B 6/43

See application file for complete search history.

(56) References Cited

U.S. PATENT DOCUMENTS 3,673,327 A *  6/1972  Johnson ................. G06F 3/0421
                                                    178/18.04
4,484,179 A *  11/1984  Kasday ................... G01L 1/247
                                                    178/18.01
(Continued)

FOREIGN PATENT DOCUMENTS

EP            2485122 A1    8/2012
WO          2009077962      6/2009
(Continued)

OTHER PUBLICATIONS

"Using micro-structures to couple light into thin light-guides", by Yun Chen, Master of Science Thesis, Stockholm 2011, TRITA-ICT-EX-2011:112.
(Continued)

*Primary Examiner* — Christopher E Leiby
(74) *Attorney, Agent, or Firm* — Harness, Dickey & Pierce, P.L.C.

(57) ABSTRACT

A touch-sensitive apparatus operates by light frustration (FTIR) and comprises a light transmissive panel (1) with a front surface and a rear surface. Light emitters (2) and light detectors (3) optically face the rear surface along a perimeter of a touch-sensitive region (4) on the panel (1). At least one diffusively reflecting element (40) is arranged on the front surface (5) along the perimeter of the touch-sensitive region (4). The light emitters (2) are arranged to emit a respective beam of light onto the diffusively reflecting element (40), so as to generate propagating light that propagates by total internal reflection inside the panel (1) across the touch-sensitive region (4), and the light detectors (3) are arranged to receive detection light generated as the propagating light impinges on the diffusively reflecting element (40), so as to define a grid of propagation paths (D) across the touch-
(Continued)

sensitive region (4) between pairs of light emitters (2) and light detectors (3).

21 Claims, 6 Drawing Sheets

Related U.S. Application Data (60) Provisional application No. 61/738,059, filed on Dec. 17, 2012.

(52) U.S. Cl.
CPC .. *G02B 6/0023* (2013.01); *G06F 2203/04107* (2013.01); *G06F 2203/04109* (2013.01)

(56) References Cited

U.S. PATENT DOCUMENTS

| | | | |
|---|---|---|---|
| 5,087,610 A * | 2/1992 | Hed | G09F 9/37 257/E27.007 |
| 7,432,893 B2 | 10/2008 | Ma et al. | |
| 7,538,759 B2 | 5/2009 | Newton | |
| 7,995,039 B2 | 8/2011 | Eliasson et al. | |
| 8,093,545 B2 | 1/2012 | Leong et al. | |
| 8,149,221 B2 | 4/2012 | Newton | |
| 8,325,158 B2 * | 12/2012 | Yatsuda | B29D 11/00663 345/176 |
| 8,441,467 B2 * | 5/2013 | Han | G06F 3/04883 178/18.09 |
| 8,466,901 B2 * | 6/2013 | Yen | G06F 3/0421 178/18.09 |
| 8,963,886 B2 * | 2/2015 | Wassvik | G06F 3/042 178/18.09 |
| 9,213,445 B2 * | 12/2015 | King | G06F 3/0421 |
| 2003/0034935 A1 | 2/2003 | Amanai et al. | |
| 2004/0212603 A1 * | 10/2004 | Cok | G06F 3/0412 345/175 |
| 2005/0179977 A1 | 8/2005 | Chui et al. | |
| 2005/0248540 A1 | 11/2005 | Newton | |
| 2005/0276053 A1 | 12/2005 | Nortrup et al. | |
| 2006/0114237 A1 | 6/2006 | Crockett et al. | |
| 2006/0279558 A1 * | 12/2006 | Van Delden | G02F 1/13338 345/176 |
| 2008/0088603 A1 * | 4/2008 | Eliasson | G06F 3/0312 345/176 |
| 2008/0284925 A1 * | 11/2008 | Han | G06F 3/0425 349/12 |
| 2008/0291668 A1 * | 11/2008 | Aylward | G02B 6/0068 362/225 |
| 2009/0122020 A1 | 5/2009 | Eliasson et al. | |
| 2009/0122027 A1 | 5/2009 | Newton | |
| 2009/0189857 A1 * | 7/2009 | Benko | G06F 3/0421 345/158 |
| 2010/0187422 A1 * | 7/2010 | Kothari | G06F 3/0428 250/353 |
| 2010/0295821 A1 * | 11/2010 | Chang | G06F 3/0421 345/175 |
| 2010/0302196 A1 * | 12/2010 | Han | G06F 3/0425 345/173 |
| 2010/0302209 A1 * | 12/2010 | Large | G02B 6/10 345/175 |
| 2011/0043490 A1 * | 2/2011 | Powell | G06F 3/0421 345/176 |
| 2011/0051394 A1 | 3/2011 | Bailey | |
| 2011/0163997 A1 * | 7/2011 | Kim | G06F 3/0421 345/175 |
| 2012/0217882 A1 * | 8/2012 | Wong | F21V 23/0464 315/185 R |
| 2012/0274559 A1 * | 11/2012 | Mathai | G02B 5/0278 345/158 |
| 2013/0021302 A1 | 1/2013 | Drumm | |
| 2013/0107569 A1 | 5/2013 | Suganuma | |
| 2013/0135258 A1 * | 5/2013 | King | G06F 3/0421 345/175 |
| 2013/0135259 A1 | 5/2013 | King et al. | |
| 2013/0181896 A1 * | 7/2013 | Gruhlke | G06F 3/017 345/156 |
| 2013/0300716 A1 | 11/2013 | Craven-Bartle et al. | |
| 2014/0160762 A1 | 6/2014 | Dudik et al. | |
| 2015/0324028 A1 * | 11/2015 | Wassvik | G06F 3/042 345/175 |
| 2015/0346856 A1 * | 12/2015 | Wassvik | G06F 3/042 345/175 |

FOREIGN PATENT DOCUMENTS

| | | |
|---|---|---|
| WO | 2010015408 | 2/2010 |
| WO | 2010064983 | 6/2010 |
| WO | 2011049511 | 4/2011 |
| WO | 2011139213 | 11/2011 |
| WO | 2012050510 | 4/2012 |
| WO | 2012105893 A1 | 8/2012 |
| WO | WO-2013/036192 A1 | 3/2013 |
| WO | 2013062471 | 5/2013 |
| WO | WO-2013/191638 A1 | 12/2013 |
| WO | WO-2014/017973 A1 | 1/2014 |

OTHER PUBLICATIONS

"Light coupling for integrated optical waveguide-based sensors", by Steindorfer et al., published in Optical Sensing and Detection, proceedings of the SPIE, vol. 7726, pp. 77261S-1-77261S-10 (2010).
International Search Report dated Apr. 16, 2014 issued in International Application No. PCT/SE2013/051532.
Swedish Search Report dated Nov. 12, 2013 issued in Swedish Application No. 1251437-8.
International Search Report dated Dec. 19, 2013 issued in International Application No. PCT/SE2013/050922.
U.S. Appl. No. 14/652,760, filed Jun. 16, 2015.
U.S. Appl. No. 14/416,798, filed Jan. 23, 2015.
U.S. Office Action dated Jun. 7, 2017 in U.S. Appl. No. 14/652,760.
U.S. Office Action dated Sep. 22, 2016 in U.S. Appl. No. 14/416,798.
U.S. Office Action dated Apr. 7, 2017 in U.S. Appl. No. 14/416,798.

* cited by examiner

OPTICAL COUPLING OF LIGHT INTO TOUCH-SENSING SYSTEMS

CROSS-REFERENCE TO RELATED APPLICATIONS

The present application is a Continuation-in-part of International Application No. PCT/SE2013/051532, filed 17 Dec. 2013, which claims the benefit of Swedish patent application No. 1251437-8 filed 17 Dec. 2012, and U.S. provisional application No. 61/738,059, filed 17 Dec. 2012.

TECHNICAL FIELD

The present invention relates to touch-sensing systems that operate by propagating light by internal reflections along well-defined light paths inside a thin light transmissive panel, and in particular to optical solutions for defining the location of the light paths.

BACKGROUND ART

This type of touch-sensing system is known as an FTIR-based system (FTIR, Frustrated Total Internal Reflection). It may be implemented to operate by transmitting light inside a solid light transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

In one configuration, e.g. disclosed in U.S. 2006/0114237, the light is coupled into the panel directly through the peripheral edge surface. Such an approach allows the light to be simply and efficiently injected into the panel. Also, such an incoupling does not add significantly to the thickness of the touch system. However, incoupling via the edge surface may require the edge surface to be highly planar and free of defects. This may be difficult and/or costly to achieve, especially if the panel is thin and/or manufactured of a comparatively brittle material such as glass. Incoupling via the edge surface may also add to the footprint of the touch system. Furthermore, it may be difficult to optically access the edge surface if the panel is attached to a mounting structure, such as a frame or bracket, and it is also likely that the mounting structure causes strain in the edge surface. Such strain may affect the optical quality of the edge surface and result in reduced incoupling performance.

U.S. Pat. No. 3,673,327 discloses an FTIR-based touch system in which the emitters and detectors are arranged in rows on opposite ends of the panel, and light beams are propagated between opposite pairs of emitters and detectors so as to define a rectangular grid of propagation paths. Large prisms are attached to the bottom surface of the panel to couple the light beams into and out of the panel.

In U.S. Pat. No. 7,432,893, a few large emitters are arranged at the corners of the panel, or centrally on each side of the panel, to inject diverging light beams ("fan beams") into the panel for receipt by linear arrays of photodiodes along all sides of the panel. Each fan beam is coupled into the panel by a large revolved prism which is attached to the top surface of the panel, and the photodiodes are attached to the top or bottom surface of the panel, so as to define a plurality of propagation paths between each prism and a set of photodiodes.

By attaching prisms or wedges to the top or bottom surfaces, it is possible to relax the surface requirements of the edge surface and/or to facilitate assembly of the touch system. However, the prisms or wedges may add significant thickness and weight to the system. To reduce weight and cost, the wedge may be made of plastic material. On the other hand, the panel is often made of glass, e.g. to attain required bulk material properties (e.g. index of refraction, transmission, homogeneity, isotropy, durability, stability, etc) and surface evenness of the top and bottom surfaces. The present applicant has found that the difference in thermal expansion between the plastic material and the glass may cause a bulky wedge to come loose from the panel as a result of temperature variations during operation of the touch system. Even a small or local detachment of the wedge may cause a significant decrease in the performance of the system.

In the field of LCD display technology, which is outside the field of touch-sensitive systems, it is known to couple light from LEDs into thin waveguide panels as part of so-called backlights (BLUs, Backlight units) for LCD displays. These waveguide panels are located behind the LCD and are configured to emit light from its top surface to uniformly illuminate the rear side of the LCD. Various strategies for coupling light into waveguides for the purpose of back-illuminating LCD displays are disclosed in the publication "Using micro-structures to couple light into thin light-guides", by Yun Chen, Master of Science Thesis, Stockholm 2011, TRITA-ICT-EX-2011:112.

In the field of integrated optical sensors, which is outside the field of touch-sensitive systems, it is also known to couple light into and out of a waveguide. In the article "Light coupling for integrated optical waveguide-based sensors", by Steindorfer et al., published in Optical Sensing and Detection, proceedings of the SPIE, vol. 7726, pp. 77261S-1-77261S-10 (2010), an optical waveguide is deposited on the upper side of a substrate to be exposed to an analyte. An organic light emitting diode (OLED), which acts as a light source, and an organic photodiode as light detector are monolithically integrated on the lower side of the substrate. Fluorescent molecules are deposited on the upper side, to couple light emitted by the OLED into the waveguide, and a scattering layer is applied to the upper side to couple light out of the waveguide onto the photodiode.

SUMMARY

It is an objective of the invention to at least partly overcome one or more of limitations of prior art FTIR-based touch systems.

One objective is to provide an FTIR-based touch-sensitive apparatus which is robust and compact, while defining light propagation paths with well-defined extent.

Another objective is to enable design of an FTIR-based touch-sensitive apparatus with restricted access to the edge surface.

Yet another objective is to enable an FTIR-based touch-sensitive apparatus that is simple to assemble and suited for mass production.

A still further objective is to provide an FTIR-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

A first aspect of the invention is a touch-sensitive apparatus which comprises: a light transmissive panel that defines a front surface and an opposite, rear surface; a plurality of light emitters and a plurality of light detectors arranged to optically face the rear surface along a perimeter of a touch-sensitive region on the panel; and at least one diffusively reflecting element arranged on the front surface along the perimeter of the touch-sensitive region. The light emitters are arranged to emit a respective beam of light onto said at least one diffusively reflecting element, so as to generate propagating light that propagates by total internal reflection inside the panel across the touch-sensitive region. The light detectors are arranged to receive detection light generated as the propagating light impinges on said at least one diffusively reflecting element, so as to define a grid of propagation paths across the touch-sensitive region between pairs of light emitters and light detectors.

In one embodiment, the at least one diffusively reflecting element comprises at least one elongate strip of diffusively reflecting material.

In one embodiment, the at least one diffusively reflecting element defines a coherent frame that surrounds the touch-sensitive region.

In one embodiment, the at least one diffusively reflecting element has the shape of a sequence of partially overlapping dots of elliptic shape, preferably circular shape.

In another embodiment, the at least one diffusively reflecting element comprises a plurality of spatially separated dots that are arranged along the perimeter of the touch-sensitive region.

In one embodiment, the at least one diffusively reflecting element is configured to exhibit at least 50% diffuse reflection, and preferably at least 90% diffuse reflection.

In one embodiment, the at least one diffusively reflecting element is an essentially Lambertian (near-Lambertian) diffuser.

In one embodiment, the at least one diffusively reflecting element is configured to promote emission of diffusively reflected light at angles that sustain light propagation by said total internal reflection inside the panel. Thus, the diffusively reflecting element is non-Lambertian.

In one embodiment, the at least one diffusively reflecting element comprises one of white paint, white paper, Spectralon, a light transmissive diffusing material covered by a reflective material, an engineered diffuser, and a reflective semi-random micro-structure.

In one embodiment, the touch-sensitive apparatus further comprises a shielding layer which is applied onto said at least one diffusively reflecting element and which defines an opaque frame around the perimeter of the touch-sensitive region. In one implementation, the shielding layer comprises diamond-like carbon (DLC).

In one embodiment, the touch-sensitive apparatus further comprises a light reflective edge element arranged on an edge portion that connects the front surface and the rear surface of the panel adjacent to at least one of: each of the light emitters and each of the light detectors.

In one embodiment, the touch-sensitive apparatus further comprises a plurality of light reflective rear elements that are arranged on the rear surface, wherein each of the light reflective rear elements define a light transmissive opening which is aligned with a respective light emitter.

In one embodiment, the touch-sensitive apparatus further comprises a light absorptive edge element arranged on an edge portion that connects the front surface and the rear surface of the panel adjacent to each of the light emitters.

In one embodiment, the touch-sensitive apparatus further comprises a plurality of light absorptive rear elements that are arranged on the rear surface, wherein each of the light absorptive rear elements define a light transmissive opening which is aligned with a respective light detector.

In one embodiment, the light emitters and the light detectors are arranged with an air gap to the rear surface.

In one embodiment, a filter is arranged intermediate the rear surface and each light detector, and wherein the filter comprises at least one of a wavelength filter, which is configured to selectively transmit light at wavelengths included in the light emitted by the light emitters, and an angular filter, which is configured to selectively transmit the detection light from said at least one diffusively reflecting element directly above the light detector.

In one embodiment, the light emitters and the light detectors are arranged relative to said at least one diffusively reflecting element such that adjacent propagation paths partially overlap along their extent across the touch-sensitive region.

A second aspect of the invention is a touch-sensitive apparatus which comprises: a light transmissive panel that defines a front surface and an opposite, rear surface; a plurality of light emitters arranged to optically face the rear surface along a perimeter of a touch-sensitive region on the panel; a plurality of light detectors optically connected to the panel; and at least one diffusively reflecting element arranged on the front surface along the perimeter of the touch-sensitive region. The light emitters are arranged to emit a respective beam of light onto said at least one diffusively reflecting element, so as to generate propagating light that propagates by total internal reflection inside the panel across the touch-sensitive region. The light detectors are arranged to define a grid of propagation paths across the touch-sensitive region between pairs of light emitters and light detectors.

A third aspect of the invention is a touch-sensitive apparatus which comprises: a light transmissive panel that defines a front surface and an opposite, rear surface; a plurality of light emitters optically connected to the panel so as to generate propagating light that propagates by total internal reflection inside the panel across a touch-sensitive region on the panel; a plurality of light detectors arranged to optically face the rear surface along a perimeter of the touch-sensitive region on the panel; and at least one diffusively reflecting element arranged on the front surface along the perimeter of the touch-sensitive region. The light detectors are arranged to receive detection light generated as the propagating light impinges on said at least one diffusively reflecting element, so as to define a grid of propagation paths across the touch-sensitive region between pairs of light emitters and light detectors.

Any one of the above-described embodiments of the first aspect may be adapted and implemented as an embodiment of the second and third aspects.

Alternative aspects of the invention relate to a touch-sensitive apparatus that comprises a light transmissive panel that defines a front surface, an opposite rear surface, and a circumferential edge surface that connects the front and rear surfaces; and at least one diffusively reflecting element which is arranged on at least part of the circumferential edge surface. In a first alternative aspect, the touch-sensitive apparatus further comprises a plurality of light emitters arranged to optically face the rear surface along a perimeter of a touch-sensitive region on the panel; and a plurality of light detectors optically connected to the panel, wherein the light emitters are arranged to emit a respective beam of light onto said at least one diffusively reflecting element, so as to generate propagating light that propagates by total internal reflection inside the panel across the touch-sensitive region; and wherein the light detectors are arranged to define a grid of propagation paths across the touch-sensitive region between pairs of light emitters and light detectors. In a second alternative aspect, the touch-sensitive apparatus further comprises a plurality of light emitters optically connected to the panel so as to generate propagating light that propagates by total internal reflection inside the panel across a touch-sensitive region on the panel; a plurality of light detectors arranged to optically face the rear surface along a perimeter of the touch-sensitive region on the panel; wherein the light detectors are arranged to receive detection light generated as the propagating light impinges on said at least one diffusively reflecting element, so as to define a grid of propagation paths across the touch-sensitive region between pairs of light emitters and light detectors. In a third alternative aspect, the touch-sensitive apparatus further comprises a plurality of light emitters and a plurality of light detectors arranged to optically face the rear surface along a perimeter of a touch-sensitive region on the panel; wherein the light emitters are arranged to emit a respective beam of light onto said at least one diffusively reflecting element, so as to generate propagating light that propagates by total internal reflection inside the panel across the touch-sensitive region; and wherein the light detectors are arranged to receive detection light generated as the propagating light impinges on said at least one diffusively reflecting element, so as to define a grid of propagation paths across the touch-sensitive region between pairs of light emitters and light detectors.

Any one of the above-described embodiments of the first aspect may be adapted and implemented as an embodiment of the alternative aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

In the following, embodiments of the present invention will be presented for a specific example of a touch-sensitive apparatus. Throughout the description, the same reference numerals are used to identify corresponding elements.

Figure 1A:
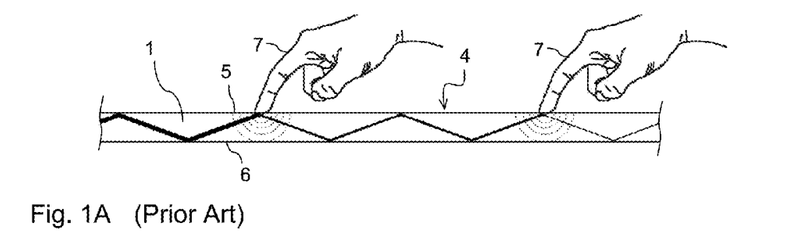
FIG. 1A is a section view of a light transmissive panel using FTIR for touch detection.

FIG. 1A illustrates the concept of touch detection based on attenuation by FTIR (Frustrated Total Internal Reflection) of propagating light. According to this concept, light is transmitted inside a panel 1 along a plurality of well-defined propagation paths. The panel 1 is made of solid material in one or more layers and may have any shape. The panel 1 defines an internal radiation propagation channel, in which light propagates by internal reflections. In the example of FIG. 1A, the propagation channel is defined between the boundary surfaces 5, 6 of the panel 1, and the front (top) surface 5 allows the propagating light to interact with touching objects 7 and thereby defines a touch-sensitive region 4 ("touch surface"). The interaction is enabled by injecting the light into the panel 1 such that the light is reflected by total internal reflection (TIR) in the front surface 5 as it propagates through the panel 1. The light may be reflected by TIR in the rear (bottom) surface 6 or against a reflective coating thereon. It is also conceivable that the propagation channel is spaced from the rear surface 6, e.g. if the panel comprises multiple layers of different materials. The panel 1 may thus be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC). The panel 1 may be designed to be overlaid on or integrated into a display device or monitor (not shown).

As shown in FIG. 1A, an object 7 that is brought into close vicinity of, or in contact with, the touch surface 4 may interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines downstream of the touching objects 7 in FIG. 1A.

Figure 1B:
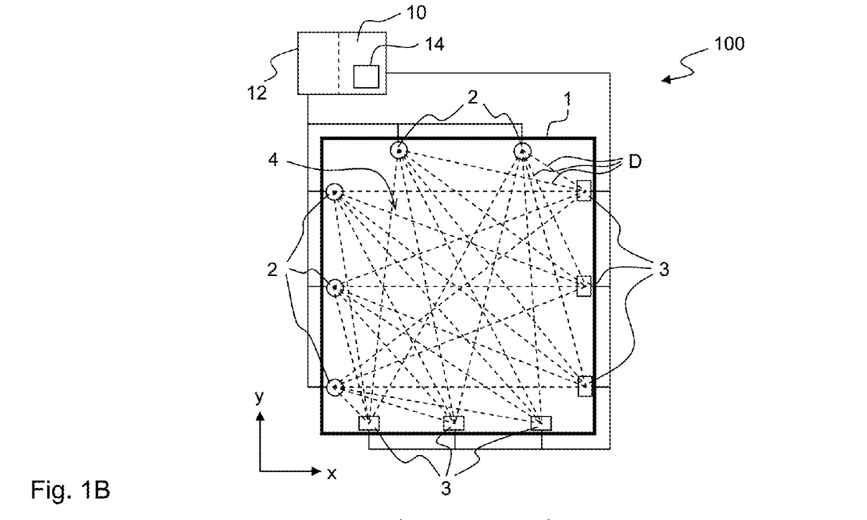
FIG. 1B is a top plan view of an FTIR-based touch-sensitive apparatus.

FIG. 1B illustrates an example embodiment of a touch-sensitive apparatus 100 that is based on the concept of FTIR. Emitters 2 (indicated by open circles throughout the description) are distributed along the perimeter of the touch surface 4, beneath the panel 1, to project light onto the panel 1 such that at least part of the light is captured inside the panel 1 for propagation by internal reflections in the propagation channel. Detectors 3 (indicated by open squares throughout the description) are distributed along the perimeter of the touch surface 4, beneath the panel 1, to receive part of the propagating light. The light from each emitter 2 will thereby propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch surface 4 between pairs of emitters 2 and detectors 3, as shown in FIG. 1B. Thus, the detection lines correspond to a projection of the propagation paths D onto the touch surface 4. Thereby, the emitters 2 and detectors 3 collectively define a grid of detection lines D ("detection grid") on the touch surface 4, as seen in a top plan view. The spacing of intersections in the detection grid defines the spatial resolution of the apparatus 100, i.e. the smallest object than can be detected on the touch surface 4.

As used herein, the emitters 2 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 2 may also be formed by the end of an optical fiber. The emitters 2 may generate light in any wavelength range. The following examples presume that the light is generated in the infrared (IR), i.e. at wavelengths above about 750 nm. Analogously, the detectors 3 may be any device capable of converting light (in the same wavelength range) into an electrical signal, such as a photo-detector, a CCD device, a CMOS device, etc.

The detectors 3 collectively provide an output signal, which is received and sampled by a signal processor 10. The output signal contains a number of sub-signals, also denoted "projection signals", each representing the energy of light received by a certain light detector 3 from a certain light emitter 2. Depending on implementation, the signal processor 10 may need to process the output signal for separation of the individual projection signals. The projection signals represent the received energy, intensity or power of light received by the detectors 3 on the individual detection lines D. Whenever an object touches a detection line, the received energy on this detection line is decreased or "attenuated".

Figure 2:
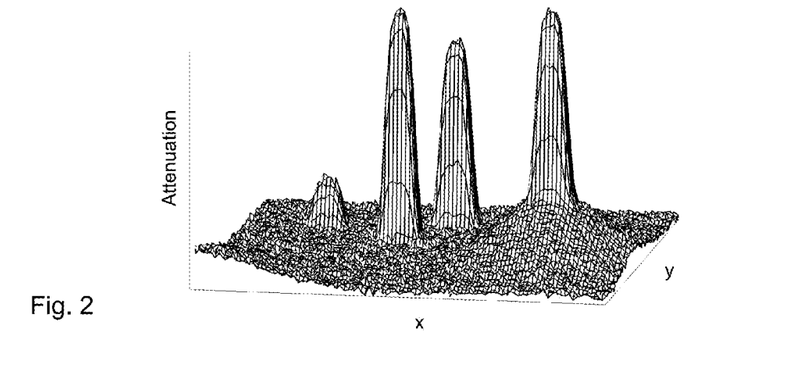
FIG. 2 is a 3D plot of an attenuation pattern generated based on energy signals from an FTIR-based touch-sensitive apparatus.

The signal processor 10 may be configured to process the projection signals so as to determine a property of the touching objects, such as a position (e.g. in the x, y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2, where the peaks of increased attenuation represent touching objects. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510 and WO2013/062471, all of which are incorporated herein by reference.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

Figure 3:
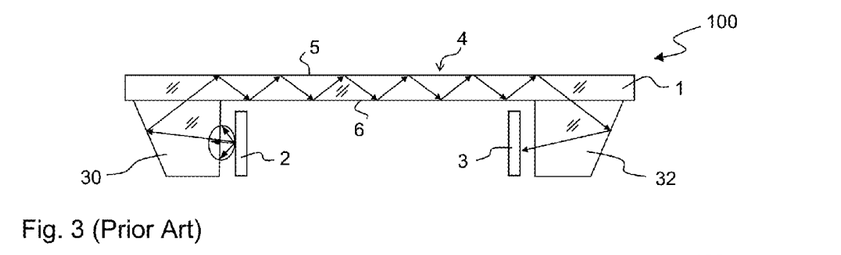
FIG. 3 is a section view of a touch-sensitive apparatus according to the prior art.

FIG. 3 is a section view of a conventional FTIR-based touch-sensitive apparatus 100, in which individual optical incoupling elements 30 (one shown) of light transmissive material are attached to the rear surface 6 of the panel 1 to achieve highly efficient specular coupling of a diverging beam of light from an individual emitter 2 into the panel 1. Correspondingly, individual optical outcoupling elements 32 (one shown) are attached to the rear surface 6 to achieve highly efficient specular coupling of light out of the panel 1 onto an individual detector 3. To achieve efficient coupling of light, the emitters 2 and detectors 3 may need to be precisely mounted in relation to the coupling elements 30, 32, which may be difficult to achieve in mass production. Also, the luminance profile of the light generated by the emitter 2 affects the resulting distribution of light within the panel 1, e.g. the distribution of light between the different detection lines. The use of coupling elements 30, 32 also adds weight and height to the apparatus 100.

Furthermore, the use of individual coupling elements 30, 32 typically results in a width (cross-section) of the detection lines (as seen in a top plan view) which is narrow compared to the center-to-center spacing of adjacent coupling elements. This may lead to an incomplete coverage of the touch surface 4 by the detection lines. Depending on the arrangement of emitters 2 and detectors 3, the incomplete coverage may be pronounced at vertical or horizontal symmetry lines across the touch surface 4 and at the periphery of the touch surface 4 close to the coupling elements 30, 32. Incomplete coverage is likely to cause aliasing artifacts to occur in the reconstructed attenuation pattern, making touch determination more difficult. Furthermore, to reduce system cost, it may be desirable to minimize the number of electro-optical components 2, 3, but a reduced number of components tends to increase the spacing between detection lines and may thus enhance the reconstruction artifacts.

Figure 4A:
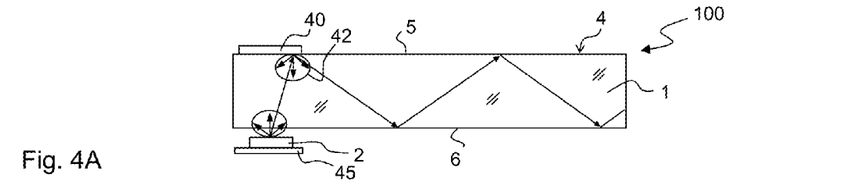
FIGS. 4A-4B are section views of diffusive incoupling and outcoupling according to embodiments of the invention.

Embodiments of the invention take a fundamentally different approach to generate the detection lines. In one incoupling embodiment, shown in FIG. 4A, each emitter 2 is arranged to optically face the panel 1, and a diffuser 40 is attached to the front surface 5 opposite to emitter 2 at the periphery of the touch surface 4, in this example at the rim of the panel 1. The diffuser 40 scatters the incoming light from the emitter 2 into the panel 1 by diffuse reflection. As is well-known to the skilled person, "diffuse reflection" refers to reflection of light from a surface such that an incident ray is reflected at many angles rather than at just one angle as in "specular reflection". Thus, a diffusively reflecting element will, when illuminated, emit light by reflection over a large solid angle at each location on the element. The diffusely reflected light is indicated by encircled rays 42 on the drawings. The diffuse reflection is also known as "scattering". Accordingly, the diffuser 40 will act as a light source ("secondary light source") which is located in contact with the propagation channel inside the panel 1 to emit diffuse light. The secondary light source thereby defines the actual origin of the detection lines that are generated by the light from the respective emitter 2. Since the diffuser 40 more or less randomly re-distributes the incoming light, the importance of the luminance profile of the emitter 2 is reduced or even eliminated. This means that the diffuser 40 has the ability to act as a secondary light source for many different types of emitters 2 and for many different relative orientations between the emitter 2 and the diffuser 40, as long as the light from the emitter 2 hits the diffuser 40 with a proper extent and at a proper location. The use of the diffuser 40 also enables a compact design of the apparatus 100. As shown in FIG. 4A, the emitter 2 may be arranged on a connecting substrate 45 such as a PCB (Printed Circuit Board) which is designed to supply power and transmit control signals to the emitter 2. In FIG. 4A, the emitter 2 is arranged to optically face the panel 1, and thereby the PCB 45 may be arranged flat along the rear surface 6. Furthermore, the diffuser 40 may be provided as a thin coating which is essentially flush with the front surface 5.

The diffuser 40 may be configured as an essentially ideal diffuse reflector, also known as a Lambertian or near-Lambertian diffuser, which generates equal luminance from all directions in a hemisphere surrounding the diffuser 40. Many inherently diffusing materials form a near-Lambertian diffuser. In an alternative, the diffuser 40 may be a so-called engineered diffuser, e.g. a holographic diffuser. The engineered diffuser may also be configured as a Lambertian diffuser. In a variant, the engineered diffuser is tailored to promote diffuse reflection into certain directions in the surrounding hemisphere, in particular to angles that are capable of sustaining total internal reflection in the radiation propagation channel inside the panel 1. There are also inherently diffusing materials that promote diffuse reflection into certain directions and that may be arranged on the panel 1 to form the diffuser 40.

Many materials exhibit a combination of diffuse and specular reflection. In the set up of FIG. 4A, any light that is specularly reflected by the diffuser 40 will leave the panel 1 through the rear surface 6 and result in coupling losses. It is thus preferred that the relation between diffusive and specular reflection is high for the diffuser 40. It is currently believed that reasonable performance may be achieved, at least for smaller touch surfaces, when at least 50% of the reflected light is diffusively reflected. Preferably, the diffuser 40 is designed to reflect incoming light such that at least about 60%, 70%, 80%, 90%, 95%, or 99% of the reflected light is diffusively reflected.

The diffuser 40 may be implemented as a coating, layer or film applied to the front surface 5, e.g. by painting, spraying, lamination, gluing, etc. In one embodiment, the diffuser 40 is implemented as matte white paint or ink applied to the front surface 5. In order to achieve a high diffuse reflectivity, it may be preferable for the paint/ink to contain pigments with high refractive index. One such pigment is $TiO_2$, which has a refractive index n=2.8. It may also be desirable, e.g. to reduce Fresnel losses, for the refractive index of the paint filler and/or the paint vehicle to match the refractive index of the surface material in the front surface. The properties of the paint may be further improved by use of EVOQUE™ Pre-Composite Polymer Technology provided by the Dow Chemical Company.

There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc.

Alternatively, the diffuser 40 may be implemented as a flat or sheet-like device, e.g. the above-mentioned engineered diffuser or white paper, which is attached to the front surface 5 by an adhesive. According to other alternatives, the diffuser 40 may be implemented as a semi-randomized (non-periodic) micro-structure in or on the front surface 5 with an overlying coating of reflective material. The microstructure may e.g. be provided by etching, embossing, molding, abrasive blasting, etc. In another alternative, the diffuser 40 may be light transmissive (e.g. a light transmissive diffusing material or a light transmissive engineered diffuser) and covered with a coating of reflective material.

Figures 4B, 5A:
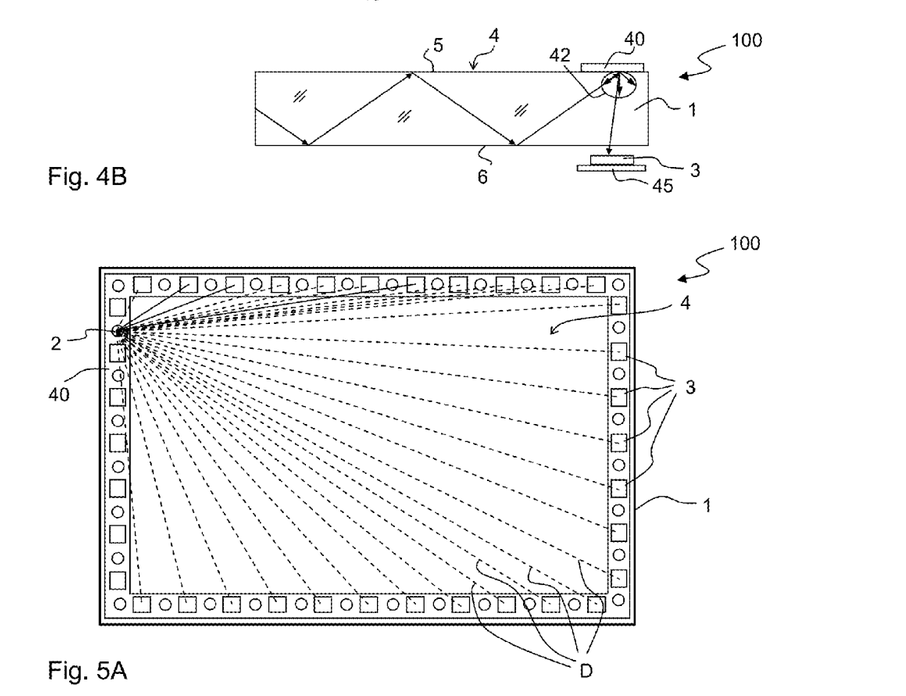
FIG. 5A is a top plan view of a touch-sensitive apparatus according to one embodiment.

In one outcoupling embodiment, shown in FIG. 4B, each detector 3 is arranged to optically face the panel 1, and a diffuser 40 is attached to the front surface 5 opposite to the detector 3 at the periphery of the touch surface 4, in this example at the rim of the panel 1. The diffuser 40 scatters the incoming propagating light by diffuse reflection, whereby at least part of the diffusively scattered light reaches the detector 3. Accordingly, each diffuser 40 will act as a light source ("secondary light source") that diffusively emits "detection light" for receipt by the detector 3. The secondary light source thereby defines the direction of the detection lines from the emitters 2 across the touch surface 4. The diffuser 40 in FIG. 4B may be configured in the same way as the diffuser 40 in FIG. 4A, to attain corresponding advantages. In the illustrated embodiment, the detector 3 is attached to a PCB 45 which is designed to supply power to and transmit measurement data from the detector 3. The use of the diffuser 40 allows the detector 3 to optically face the panel 1 and the PCB 45 to be arranged flat alongside the rear surface 6.

It is to be understood that the apparatus 100 may implement the diffusive coupling technique only for incoupling (or outcoupling), while employing conventional coupling techniques for outcoupling (or incoupling), e.g. by dedicated coupling elements as shown in FIG. 3, by direct attachment to the front or rear surface, or by optical coupling via the edge surface as discussed in the Background section. However, additional technical advantages are achieved by implementing the diffusive coupling technique for both incoupling and outcoupling (denoted "combined diffusive coupling" in the following). For one, the assembly of the apparatus 100 may be further facilitated and more suitable for mass production. Eliminating dedicated optical coupling elements may yield reductions in terms of cost, weight and thickness. Furthermore, the same (or a similar) diffuser 40 may be used for both incoupling and outcoupling, and the impact of tolerances in the placement of the emitters and detectors with respect to the panel may be reduced.

Another technical advantage of combined diffusive coupling is that it enables simple optical coupling to the panel 1 of a sequence of electro-optical components (emitters 2, detectors 3, or both) that are arranged along one and the same side of the touch surface 4. Furthermore, it is possible to generate broad detection lines D, e.g. to cause the detection lines D of adjacent components 2, 3 to partly overlap, if desired. Still further, the components 2, 3 may be arranged in close proximity to each other beneath the panel 1, if desired, while achieving proper incoupling and outcoupling of light.

In a first embodiment with combined diffusive coupling, the diffusers 40 are implemented by a coherent band or strip of diffusively reflecting material that extends along a portion outside the perimeter of the touch surface 4, and the emitters 2 and detectors 3 are arranged beneath the panel 1 along the extent of the strip 40. One example of the first embodiment is shown in plan view in FIG. 5A. The emitters 2 and detectors 3 are alternated around the entire perimeter of the touch surface 4 and the strip 40 forms a frame around the touch surface 4. For the purpose of illustration, the emitters 2 and detectors 3 are made visible through the strip 40. FIG. 5A also schematically indicates the detection lines D that are defined between one emitter 2 on one side of the rectangular touch surface 4 and the detectors 3 on the other sides of the touch surface 4.

Figure 5B:
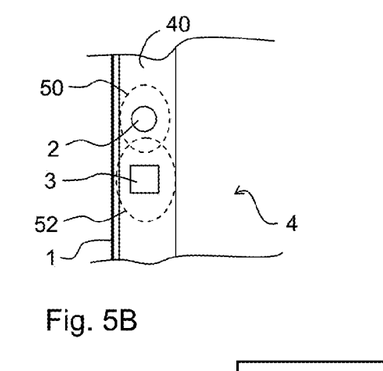
FIGS. 5B-5C are enlarged views to illustrate characteristics of the embodiment in FIG. 5A.

FIG. 5B is an enlarged view of the panel in FIG. 5A and shows one emitter 2 and one detector 3 beneath the strip 40. The dashed line 50 indicates the region of the strip 40 that is illuminated by the emitter 2 and thus defines a region of origin for the light that is propagated along the associated detection lines (not shown). The dashed line 52 similarly indicates the projection of the field of view of the detector 3 onto the strip 40 and thus defines a region of origin for the light that is received by the detector 3 on associated detection lines (not shown). It is thus realized that the detection lines associated with the adjacent emitter 2 and detector 3 in FIG. 5B may be brought to partly overlap by controlling the overlap of the projection regions 50, 52 on the strip 40. The cross-section of detection lines created in this way is broad with long tails, with overlap between the detection lines from neighboring components 2, 3. Thus, by broadening the detection lines, the coverage of the touch surface 4 may be improved. The broadening of the detection lines effectively corresponds to a low pass filtering of the projection signals, which may enable a reduction of reconstruction artifacts.

The coherent strip 40 also has the advantage of reducing the mounting tolerances of the components 2, 3 in relation to the panel 1, since detection lines will be defined as long as the projection regions 50, 52 fall within the strip 40.

Figure 5C:
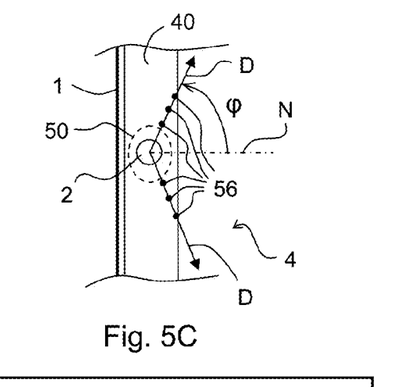

One potential drawback of the coherent strip 40 in FIG. 5A is that detection lines D that extend at large angles φ to the normal N of the strip 40 (in the plane of the panel 1) may exhibit a poor transfer efficiency if the propagating light hits the strip 40 outside of the respective projection region 50, 52. Each hit will result in a diffusive reflection of light and thus a loss of propagating light. This phenomenon is further illustrated in FIG. 5C, where the light that originates from a projection region 50 of an emitter 2 and propagates by internal reflections along two detection lines D is scattered against the strip 40 at three locations 56 outside the projection region 50. It is realized that this "self-scattering phenomenon" primarily affects the detection lines D that extend close to and along an edge of the touch surface 4 (cf. FIG. 5A), potentially resulting in poor performance in these regions.

Figure 6A:
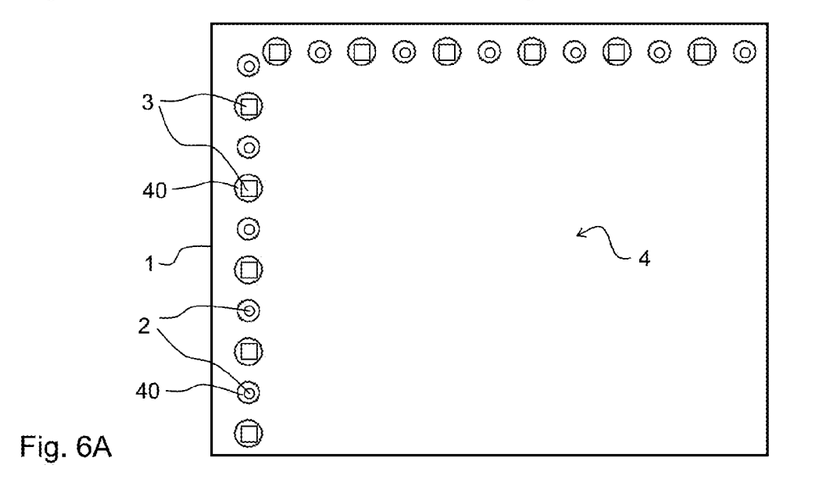
FIGS. 6A-6B are top plan views of a touch-sensitive apparatus according to other embodiments.

The self-scattering may be overcome by a second embodiment with combined diffusive coupling, in which the diffusers 40 are configured as dots of diffusive material on the front surface 5. It may be preferable for the dots 40 to be elliptic, e.g. approximately circular, although other shapes are conceivable, e.g. polygons. FIG. 6A is a top view of a corner portion of an apparatus 100 that implements the second embodiment. For the purpose of illustration, the emitters 2 and detectors 3 are made visible beneath the dots 40, which thus are located directly above a respective emitter/detector. It is realized that the use of confined and spatially separated dots 40 will reduce the impact of self-scattering on the detection lines D that extend close to and along an edge of the touch surface 4.

In this specific example, the dots 40 above the detectors 3 are larger than the dots 40 above the emitters 2, for the purpose of increasing the detection efficiency. Other configurations are possible. Generally, the distribution and size of the dots 40 may be optimized with respect to maximizing the coverage of the touch surface 4 by the detection lines while minimizing the impact of self-scattering.

Figure 6B:
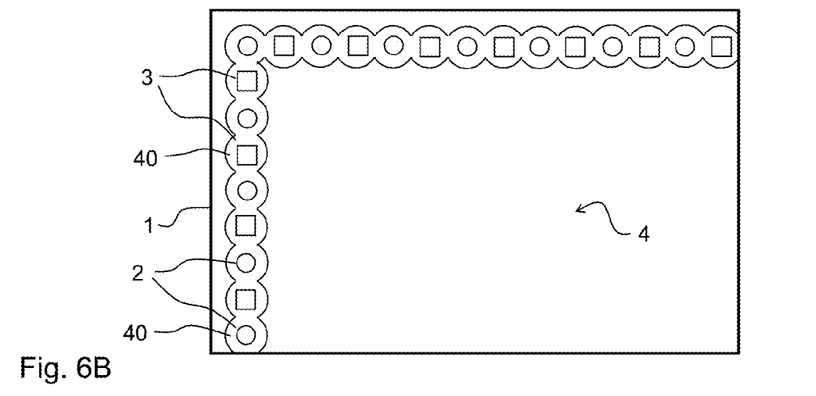

FIG. 6B illustrates a variant in which adjacent dots 40 are arranged to partially overlap while still reducing the amount of self-scattering. This variant may be seen as a hybrid of the strip in FIG. 5A and the separated dots in FIG. 6A, since the overlapping dots 40 effectively form a coherent strip with a undulating border towards the touch surface for reduction of self-scattering. In fact, the overlapping dots may be implemented as a coherent strip which is attached to the panel 1.

To optimize coupling efficiency, the projection regions 50, 52 may be matched to the extent of the respective dot 40. However, a perfect match may introduce undesirably strict tolerance requirements, e.g. with respect to the performance of individual components 2, 3 and the placement of the components 2, 3. Furthermore, the distance between the panel 1 and the components 2, 3 may change slightly when the touch surface 4 is being touched, causing variations in the size of the projections regions 50, 52 and thus variations in the projection signals. It may therefore be desirable to ensure that, nominally, the projection regions 50 (the beam spot) of the emitters 2 are smaller than and are included within the respective dot 40, and the projection regions 52 of the detectors 3 are larger than and include the respective dot 40.

FIGS. 7A-7D illustrate modifications to the incoupling embodiment in FIG. 4A.

Figure 7A:
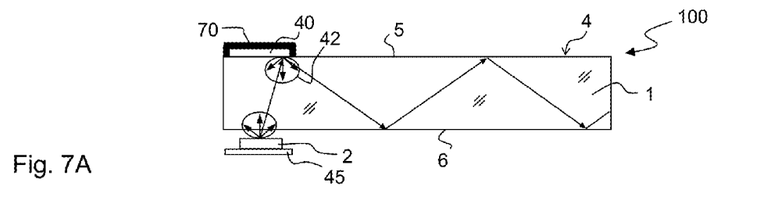
FIGS. 7A-7D are section views of variants of the diffusive incoupling in FIG. 4A.

In FIG. 7A, a shield 70 is applied on top of the diffuser 40 to protect and hide the diffuser 40 from view, and also to hide the internal structure of the apparatus 100 from view. The shield 70 may be implemented as a coating and is non-transmissive (opaque) to visible light. The shield 70 may also be designed to block ambient light in the IR region. Preferably, the shield 70 extends as a frame around the touch surface 4 at the rim of the panel 1. When the diffuser 40 is configured as a coherent strip (FIG. 5), such a shielding frame may be simply arranged on top of the strip. When the diffuser 40 is configured as dots (FIG. 6), a specular reflection coating may be applied to the front surface 5 between the dots, and possibly also on the dots, under the shielding frame 70, so as to sustain internal propagation of light along the detection lines. Alternatively, the specular reflection coating may be omitted and the shield 70 may be made of a material that has the dual function of blocking visible light while sustaining internal reflections. One such material is Diamond-Like Carbon (DLC) in any of its forms. DLC blocks visible light, transmits IR light and has a refractive index in the IR wavelength region of about n=2, which typically is higher than the refractive index of the panel material. This means that light with an angle to sustain propagation by TIR inside the panel 1 across the touch surface 4 will, when impinging on the shielding frame 70 of DLC material outside the dots, enter the DLC material and be reflected by TIR at the top DLC-air-interface, and then re-enter and continue to propagate in the panel 1. At the same time, the DLC material will protect the dots 40 and hide them from view. A further benefit of using a DLC coating is that touches on the frame 70 between the dots will frustrate the propagating light, and thus the extent of the touch surface 4 is increased.

Figure 7B:
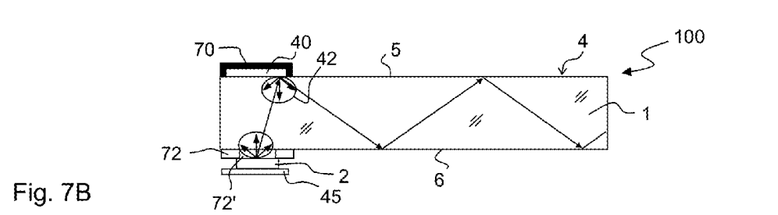

In FIG. 7B, an annular reflective element 72 is applied to the rear surface 6 to define a central opening or hole 72' that admits light from the emitter 2 to enter the panel 1. The annular reflective element 72 is arranged to recycle, by diffuse and/or specular reflection, a portion of the light that is diffusively reflected by the diffuser 40 in a direction back towards the rear surface 6 at angles that do not sustain propagation by TIR across the touch surface 4. The element 72 thus defines a recycling mask around the emitter 2 as seen in a plan view of the panel 1 and operates to increase the coupling efficiency.

Figure 7C:
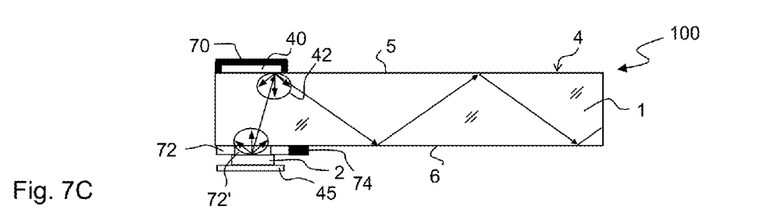

In FIG. 7C, a peripheral shield 74 is applied to the rear surface 6 to be co-located with a rim portion of the touch surface 4. The peripheral shield 74 serves the purpose of hiding the edge of a display or monitor (not shown) that may be mounted beneath the panel 1. The peripheral shield 74 may be implemented as a coating and is non-transmissive (opaque) to visible light. Suitable materials include black paint and black chrome.

Figure 7D:
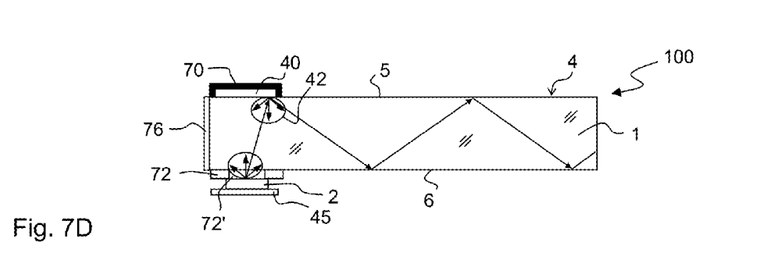

In FIG. 7D, a reflective edge element 76 is provided on the edge surface of the panel 1 to increase the efficiency of the incoupling, e.g. by recycling the portion of the light that is diffusively reflected by the diffuser 40 in a direction away from the touch surface 4 (to the left in FIG. 7D). The reflective edge element 76 may be configured for diffuse reflection, and it may be arranged to directly receive a portion of the light that is projected by emitter 2 into the panel 1 through the rear surface 6. In a variant, the element 76 may be configured for primarily specular reflection. The element 76 may have the additional function of blocking entry of ambient light through the edge surface. It may be advantageous to use the element 76 in combination with the annular reflective element 72 (as shown). In a variant, which is designed to provide a confined source of diffusively reflected light, the element 76 is instead light absorbing. Such an absorptive edge element 76 may be implemented as a coating of a material that absorbs the light emitted by emitters 2. Suitable light absorbing materials include black paint and black chrome.

In a variation of FIG. 7D, the diffuser 40 is omitted, and possibly also the element 72, and the reflective edge element 76 is configured to be diffusively reflective. Thus, the reflective edge element 76 takes the function of the diffuser 40 and forms, when illuminated by the light from the emitter 2, a secondary light source that diffusively emits light and defines the actual origin of the detection lines that are generated by the light from the respective emitter 2. The foregoing description of properties of the diffuser 40 is equally applicable to the element 76.

FIGS. 8A-8E illustrate modifications to the outcoupling embodiment in FIG. 4B.

Figure 8A:
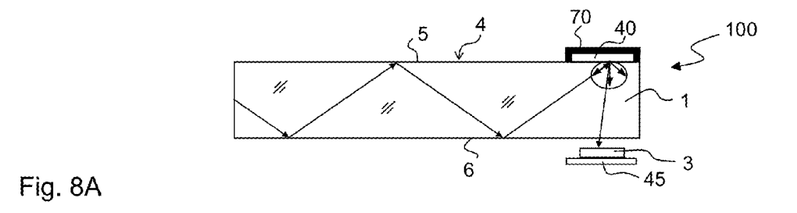
FIGS. 8A-8E are section views of variants of the diffusive outcoupling in FIG. 4B.

In FIG. 8A, a shield 70 is applied on top of the diffuser 40 in the same way and for the same purpose as the shield 70 in FIG. 7A. However, in the outcoupling embodiment, it may be desirable to design the shield 70 to block or suppress ambient light in the wavelength region sensed by the detector 3.

Figure 8B:
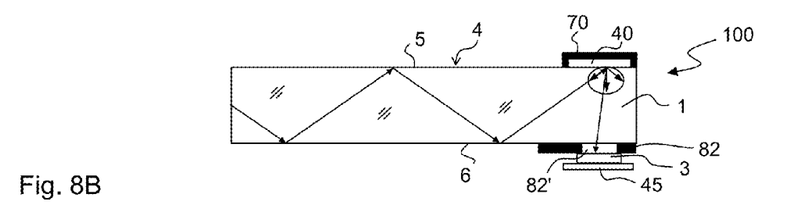

In FIG. 8B, an annular absorptive element 82 is applied to the rear surface 6 to define a central transmissive window or hole 82' that admits the diffusively reflected light from the diffuser 40 onto the detector 3. The annular absorptive element 82 is arranged to reduce the amount of stray light and ambient light that reaches the detector 3. The element 82 thus defines a shielding mask around the detector 3 as seen in a plan view of the panel 1. The element 82 may be implemented as a coating of a material that absorbs relevant wavelengths for stray light and ambient light, e.g. in the visible or IR regions. Suitable materials include black paint and black chrome. As seen in FIG. 8B, the element 82 may be extended to overlap a rim portion of the touch surface 4, thereby performing the same function as the peripheral shield 74 in FIG. 7C.

Figure 8C:
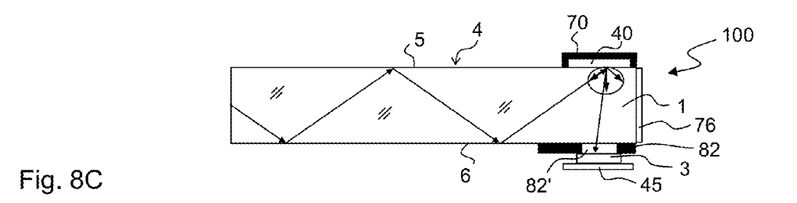

In FIG. 8C, a reflective edge element 76 is provided on the edge surface of the panel 1 in the same way and for the same purpose as the reflective edge element 76 in FIG. 7D.

In a variation of FIG. 8C, the diffuser 40 is omitted, and possibly also the element 82, and the reflective edge element 76 is configured to be diffusively reflective. Thus, the reflective edge element 76 takes the function of the diffuser 40 and forms, when illuminated by the propagating light, a secondary light source that diffusively emits detection light for receipt by the detector 3.

Figure 8D:
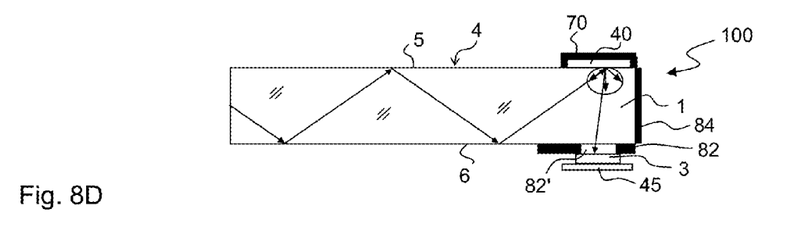

In FIG. 8D, an absorptive edge element 84 is provided on the edge surface of the panel 1 to reduce the amount of stray light and ambient light that reaches the detector 3. The element 84 may be implemented in the same material as the element 82.

Figure 8E:
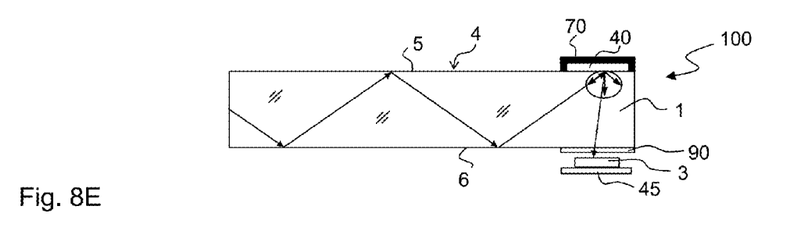

To reduce the sensitivity to ambient light, it may be advantageous to apply an ambient light suppression filter 90 to the rear surface 6 and/or on top of the detector 3. An example is schematically illustrated in FIG. 8E. The filter 90 may be a wavelength filter, which is configured to transmit only wavelengths radiated by the emitters 2, and/or an angular filter, which is configured to transmit only incoming light from the direction of the overlying diffuser 40.

Figure 9:
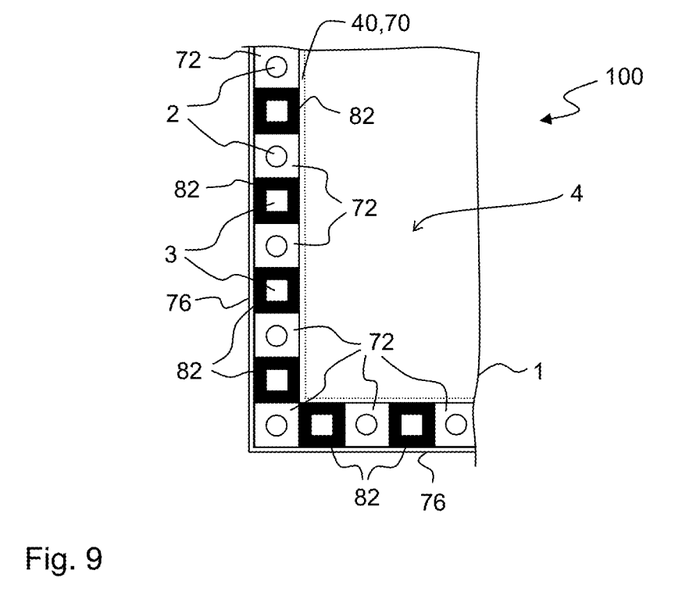
FIG. 9 is a top plan view of a touch-sensitive apparatus according to yet another embodiment.

It is to be understood that each modification described in relation to FIGS. 7A-7D and 8A-8E may be used alone or in combination with one or more of the other modifications. One example of a combination is given in FIG. 9, which is a top plan view of a corner portion of an apparatus 100 that implements the shield 70, the annular reflective elements 72, the annular absorptive elements 82 and the reflective edge elements 76, together with a diffuser 40 which is configured as a coherent frame. For the purpose of illustration, the diffuser 40 and the overlying shield 70 have been removed and are indicated by dotted lines.

In the foregoing examples, the emitters 2 and detectors 3 are mounted with an air gap to the rear surface 6. The provision of an air gap may facilitate assembly, and the air gap between the panel 1 and the detector 3 may further serve to reduce the sensitivity to ambient light. In an alternative (not shown), the air gap is replaced by an optically transmissive gel, glue or similar filling material, in order to increase the efficiency of the optical coupling. The use of a filling material between the emitter 2 and the panel 1 may allow part of the light that is generated by the emitter 2 to enter the panel 1 at angles that sustain propagation by TIR, such that the propagating light comprises both diffusively reflected light and direct light from the emitter 2. Similarly, the use of a filling material between the panel 1 and the detector 2 may allow part of the propagating light in the panel to be directly coupled out of the panel 1 onto the detector 2, in addition to diffusively reflected light.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, inside a light transmissive panel and detecting, at a number of detectors, a change in the received light caused by an interaction with the transmitted light at the point of touch.

The invention claimed is:

1. A touch-sensitive apparatus, comprising:
    a light transmissive panel that defines a front surface and an opposite, rear surface;
    a plurality of light emitters and a plurality of light detectors arranged to optically face the rear surface along a perimeter of a touch-sensitive region on the light transmissive panel; and
    at least one diffusively reflecting element arranged on the front surface along the perimeter of the touch-sensitive region;
    wherein the plurality of light emitters are configured to emit respective beams of light onto said at least one diffusively reflecting element, said at least one diffusively reflecting element configured to generate propagating light that propagates by total internal reflection inside the light transmissive panel across the touch-sensitive region; and
    wherein the plurality of light detectors are configured to receive detection light generated as the propagating light impinges on said at least one diffusively reflecting element, to define a grid of propagation paths across the touch-sensitive region between pairs of light emitters and light detectors.

2. The touch-sensitive apparatus of claim 1, wherein said at least one diffusively reflecting element comprises:
    at least one elongate strip of diffusively reflecting material.

3. The touch-sensitive apparatus of claim 1, wherein said at least one diffusively reflecting element is further configured to define a coherent frame that surrounds the touch-sensitive region.

4. The touch-sensitive apparatus of claim 1, wherein said at least one diffusively reflecting element has a shape of a sequence of partially overlapping dots, the partially overlapping dots having at least one of an elliptical shape and a circular shape.

5. The touch-sensitive apparatus of claim 1, wherein said at least one diffusively reflecting element comprises:
    a plurality of spatially separated dots arranged along the perimeter of the touch-sensitive region.

6. The touch-sensitive claim 1, wherein said at least one diffusively reflecting element is configured to exhibit at least 50% diffuse reflection.

7. The touch-sensitive apparatus of claim 1, wherein said at least one diffusively reflecting element is a Lambertian diffuser.

8. The touch-sensitive apparatus of claim 1, wherein said at least one diffusively reflecting element is further configured to promote emission of diffusively reflected light at angles that sustain light propagation by said total internal reflection inside the light transmissive panel.

9. The touch-sensitive apparatus of claim 1, wherein said at least one diffusively reflecting element comprises:
    at least one of white paint, white paper, Spectralon, a light transmissive diffusing material covered by a reflective material, an engineered diffuser, or a reflective semi-random micro-structure.

10. The touch-sensitive apparatus of claim 1, further comprising:
    a shielding layer applied to said at least one diffusively reflecting element, the shielding layer configured to define an opaque frame around the perimeter of the touch-sensitive region.

11. The touch-sensitive apparatus of claim 10, wherein the shielding layer comprises diamond-like carbon.

12. The touch-sensitive apparatus of claim 1, further comprising:
    a light reflective edge element arranged on an edge portion that connects the front surface and the rear surface of the light transmissive panel adjacent to at least one of (i) each of the plurality of light emitters or (ii) each of the plurality of light detectors.

13. The touch-sensitive apparatus of claim 1, further comprising:
    a plurality of light reflective rear elements arranged on the rear surface, wherein
        each of the plurality of light reflective rear elements define a light transmissive opening, which is aligned with a respective light emitter among the plurality of light emitters.

14. The touch-sensitive apparatus of claim 1, further comprising:
    a light absorptive edge element arranged on an edge portion that connects the front surface and the rear surface of the light transmissive panel adjacent to each of the plurality of light detectors.

15. The touch-sensitive apparatus of claim 1, further comprising:
    a plurality of light absorptive rear elements arranged on the rear surface, wherein
        each of the plurality of light absorptive rear elements defines a light transmissive opening, which is aligned with a respective light detector among the plurality of light detectors.

16. The touch-sensitive apparatus of claim 1, wherein the plurality of light emitters and the plurality of light detectors are arranged with an air gap between the rear surface and the plurality of light emitters, and between the rear surface and the plurality of light detectors.

17. The touch-sensitive apparatus of claim 1, further comprising:
    a filter arranged between the rear surface and each of the plurality of light detectors, the filter including at least one of (i) a wavelength filter configured to selectively transmit light at wavelengths included in the light emitted by the plurality of light emitters, and (ii) an angular filter configured to selectively transmit the detection light from said at least one diffusively reflecting element directly above a light detector among the plurality of light detectors.

18. The touch-sensitive apparatus of claim 1, wherein the plurality of light emitters and the plurality of light detectors are arranged relative to said at least one diffusively reflecting element such that adjacent propagation paths partially overlap along their extent across the touch-sensitive region.

19. The touch-sensitive claim 6, wherein said at least one diffusively reflecting element is further configured to exhibit at least 90% diffuse reflection.

20. A touch-sensitive apparatus, comprising:
    a light transmissive panel that defines a front surface and an opposite, rear surface;
    a plurality of light emitters arranged to optically face the rear surface along a perimeter of a touch-sensitive region on the light transmissive panel;
    a plurality of light detectors optically connected to the light transmissive panel; and
    at least one diffusively reflecting element arranged on the front surface along the perimeter of the touch-sensitive region;

wherein the plurality of light emitters are configured to emit respective beams of light onto said at least one diffusively reflecting element, said at least one diffusively reflecting element configured to generate propagating light that propagates by total internal reflection inside the light transmissive panel across the touch-sensitive region; and wherein the plurality of light detectors are configured to define a grid of propagation paths across the touch-sensitive region between pairs of light emitters and light detectors.

21. A touch-sensitive apparatus, comprising:

a light transmissive panel that defines a front surface and an opposite, rear surface;

a plurality of light emitters optically connected to the light transmissive panel to generate propagating light that propagates by total internal reflection inside the light transmissive panel across a touch-sensitive region on the light transmissive panel;

a plurality of light detectors arranged to optically face the rear surface along a perimeter of the touch-sensitive region on the light transmissive panel; and at least one diffusively reflecting element arranged on the front surface along the perimeter of the touch-sensitive region;

wherein the plurality of light detectors are configured to receive detection light generated, by diffusive reflection of the propagating light by said at least one diffusively reflecting element, to define a grid of propagation paths across the touch-sensitive region between pairs of light emitters and light detectors.

* * * * *